United States Patent
Lemay et al.

(10) Patent No.: US 8,584,989 B2
(45) Date of Patent: Nov. 19, 2013

(54) METHOD OF MANAGING MOVEMENT OF AN AIRCRAFT ON THE GROUND

(75) Inventors: David Lemay, Chaville (FR); David Frank, Paris (FR); Michel Basset, Heimsbrunn (FR); Yann Chamaillard, Le Bardon (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 112 days.

(21) Appl. No.: 13/237,402

(22) Filed: Sep. 20, 2011

(65) Prior Publication Data

US 2012/0072057 A1 Mar. 22, 2012

(30) Foreign Application Priority Data

Sep. 21, 2010 (FR) ...................................... 10 57576

(51) Int. Cl.
*G05D 3/00* (2006.01)

(52) U.S. Cl.
USPC ................... 244/183; 701/3; 701/16; 701/17; 701/23; 701/36; 244/50; 244/189; 244/184; 244/111; 303/126; 303/154; 188/71.1; 188/382

(58) Field of Classification Search
None
See application file for complete search history.

(56) References Cited

U.S. PATENT DOCUMENTS

| | | | | |
|---|---|---|---|---|
| 4,006,870 | A * | 2/1977 | Boone et al. .................. | 244/184 |
| 4,180,223 | A * | 12/1979 | Amberg ......................... | 244/111 |
| 4,482,961 | A * | 11/1984 | Kilner et al. .................... | 701/16 |
| 6,241,183 | B1 * | 6/2001 | Mathieu ...................... | 244/99.11 |
| 6,671,588 | B2 * | 12/2003 | Otake et al. ....................... | 701/3 |
| 7,300,020 | B2 * | 11/2007 | Steiner et al. .................. | 244/111 |
| 7,340,327 | B2 * | 3/2008 | Villaume et al. ................. | 701/15 |
| 7,865,289 | B2 * | 1/2011 | Dellac et al. ..................... | 701/70 |
| 7,967,247 | B2 * | 6/2011 | Bellouard et al. ............. | 244/111 |
| 8,016,366 | B2 * | 9/2011 | Rudd, III ....................... | 303/147 |
| 8,214,090 | B2 * | 7/2012 | Villaume et al. ................ | 701/13 |
| 8,244,428 | B2 * | 8/2012 | Griffith ......................... | 701/33.3 |
| 8,280,562 | B2 * | 10/2012 | Villaume et al. .................. | 701/3 |
| 8,355,831 | B2 * | 1/2013 | Villaume et al. ................ | 701/16 |
| 8,376,273 | B2 * | 2/2013 | Thompson ................. | 244/110 A |
| 2003/0125848 | A1 * | 7/2003 | Otake et al. ....................... | 701/3 |
| 2005/0006524 | A1 * | 1/2005 | Villaume et al. .............. | 244/111 |
| 2006/0038068 | A1 * | 2/2006 | Sullivan .......................... | 244/111 |
| 2006/0186267 | A1 * | 8/2006 | Steiner et al. .............. | 244/110 A |
| 2007/0252036 | A1 * | 11/2007 | Steiner et al. .................. | 244/111 |
| 2009/0218440 | A1 * | 9/2009 | Dilmaghani et al. ........... | 244/50 |
| 2009/0261197 | A1 * | 10/2009 | Cox et al. ......................... | 244/50 |
| 2010/0006699 | A1 * | 1/2010 | Sullivan ......................... | 244/111 |
| 2010/0276535 | A1 * | 11/2010 | Charuel et al. .................. | 244/50 |

FOREIGN PATENT DOCUMENTS

| NL | 2001846 C2 | 1/2010 |
|---|---|---|
| WO | 2006/134257 A1 | 12/2006 |

OTHER PUBLICATIONS

Preliminary French Search Report; cited in FR 1057576 dated Jul. 8, 2011.

* cited by examiner

*Primary Examiner* — Thomas Tarcza
*Assistant Examiner* — Richard Goldman
(74) *Attorney, Agent, or Firm* — Sughrue Mion, PLLC

(57) ABSTRACT

The invention relates to a method of managing movement of an aircraft on the ground, the aircraft including at least one left main undercarriage and at least one right main undercarriage, each comprising wheels associated with torque application members for applying torque to the wheels in response to a general setpoint, the general setpoint comprising a longitudinal acceleration setpoint and an angular speed setpoint, the method including the successive steps of braking down the general setpoint into general torque setpoints for generating by the torque application members associated with each of the wheels.

4 Claims, 3 Drawing Sheets

Level 1

Level 2A

Level 2B

Level 3

METHOD OF MANAGING MOVEMENT OF AN AIRCRAFT ON THE GROUND

The invention relates to a method of managing movement of an aircraft on the ground.

It should be recalled that an aircraft includes landing gear made up of a plurality of undercarriages, thereby providing an interface between the aircraft and the ground.

TECHNOLOGICAL BACKGROUND OF THE INVENTION

Usually, a pilot controls movement of an aircraft on the ground by acting on various controls (rudder pedals, control wheel, . . . ). In order to perform the desired movement, the pilot must handle those controls continuously, which represents a high workload.

Methods are thus known that seek to assist the pilot in managing the movement of an aircraft on the ground, the aircraft comprising at least one left main undercarriage and at least one right main undercarriage, each of which has wheels associated with torque application members. For this purpose, on the basis of a longitudinal acceleration setpoint and/or an angular speed setpoint generated by one or more controls, there is determined for each of the torque application members an individual torque setpoint for application to the associated wheel in such a manner that the individual torque setpoints together enable the aircraft to respond to the longitudinal acceleration setpoint and/or to the angular speed setpoint.

The pilot can thus manage the controls without worrying about the way in which the setpoint(s) is/are distributed in order to act on the movement of the aircraft. Nevertheless, in such methods, the longitudinal acceleration setpoint and/or the angular speed setpoint for the aircraft are approached as closely as possible with the help of a regulation loop that compares the longitudinal acceleration setpoint and/or the angular speed setpoint respectively with the real longitudinal acceleration and/or the real angular speed of the aircraft. However the regulation loop then covers numerous components and in particular all of the torque application members. In order to provide sufficiently fine control over each of the components covered within said loop, it is necessary to make use of complex control relationships. That drawback is made worse on an aircraft that is of large size.

Furthermore, such methods are found to be difficult to adapt from one aircraft configuration to another: merely as a result of changing configuration (an additional undercarriage, one wheel per undercarriage fitted with an additional torque application member, . . . ), all of the control relationships needed for distributing the longitudinal acceleration setpoint and/or the angular speed setpoint amongst each of the torque application members need to be recalculated.

OBJECT OF THE INVENTION

An object of the invention is to propose a method of managing the movement of an aircraft on the ground that obviates the above-mentioned drawbacks.

BRIEF DESCRIPTION OF THE INVENTION

In order to achieve this object, there is provided a method of managing movement of an aircraft on the ground, the aircraft having at least one left main undercarriage and at least one right main undercarriage, each having wheels associated with torque application members for applying torque to the wheels in response to a general setpoint, the general setpoint comprising a longitudinal acceleration setpoint and an angular speed setpoint.

According to the invention, the method comprises the following successive steps:

from the general setpoint, determining for each of the undercarriages an undercarriage acceleration setpoint in such a manner that the undercarriage acceleration setpoints together enable the general setpoint to be satisfied;

for each of the undercarriages, determining from the undercarriage acceleration setpoint and for each of the wheels of said undercarriage, a wheel acceleration setpoint in such a manner that the wheel acceleration setpoints together correspond to the undercarriage acceleration setpoint; and for each of the wheels, determining from the wheel acceleration setpoint a general torque setpoint for the torque to be generated by the torque application member associated with said wheel in such a manner that the general torque setpoint enables the wheel acceleration setpoint to be satisfied, and in such a manner that the torques applied to the wheels by the torque application members in response to the general torque setpoints together enable the aircraft to satisfy the general setpoint.

The landing gear of an aircraft is thus subdivided into a hierarchy of different levels: aircraft, undercarriage, and wheel. Such a modular organization of the landing gear provides a high level of adaptability to the different configurations that are possible for the aircraft: there is no longer any need to review all of the control relationships useful in sharing out the general setpoint of the aircraft, it is necessary only to review the relationships of the level that is concerned.

In addition, a regulation loop is present in each hierarchical level of the landing gear: each torque application member of the landing gear is thus controlled locally, thereby greatly simplifying the control relationships that are used.

BRIEF DESCRIPTION OF THE DRAWINGS

The invention can be better understood in the light of the following description of a particular, non-limiting embodiment of the invention given with reference to the accompanying figures, in which.

DETAILED DESCRIPTION OF THE INVENTION

Figure 1:
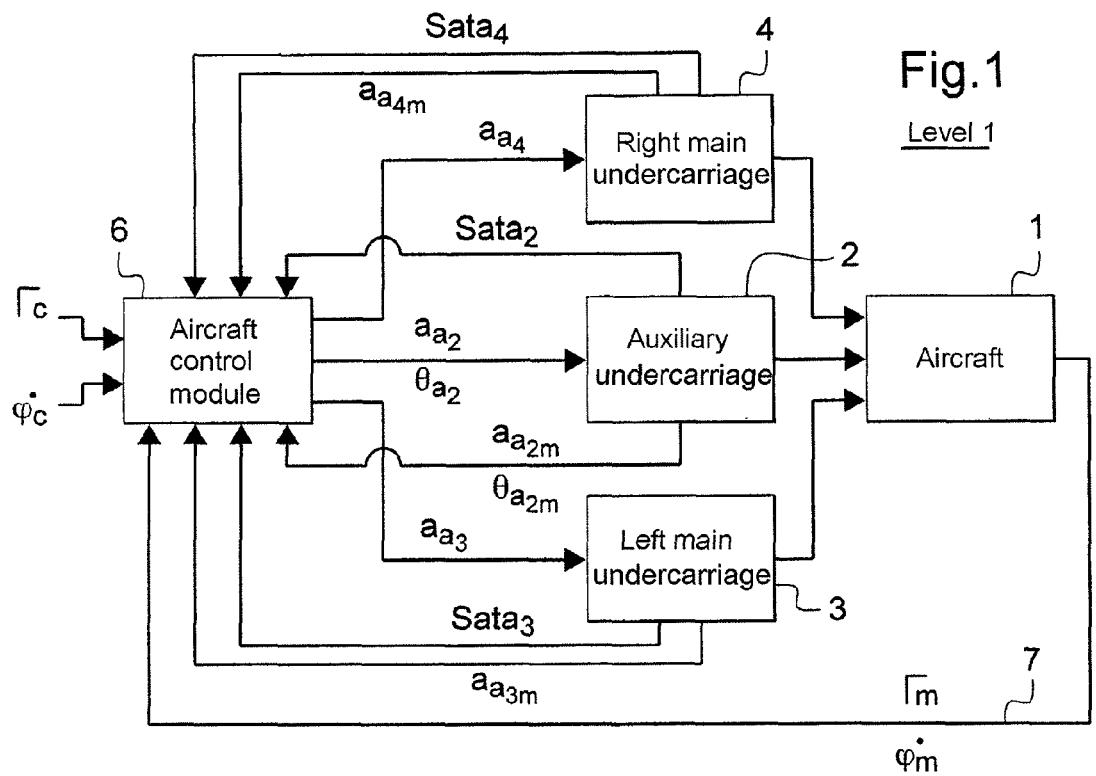
FIG. 1 is a diagram of the method of the invention implemented at a first hierarchical level in the control of landing gear.
Figure 2A:
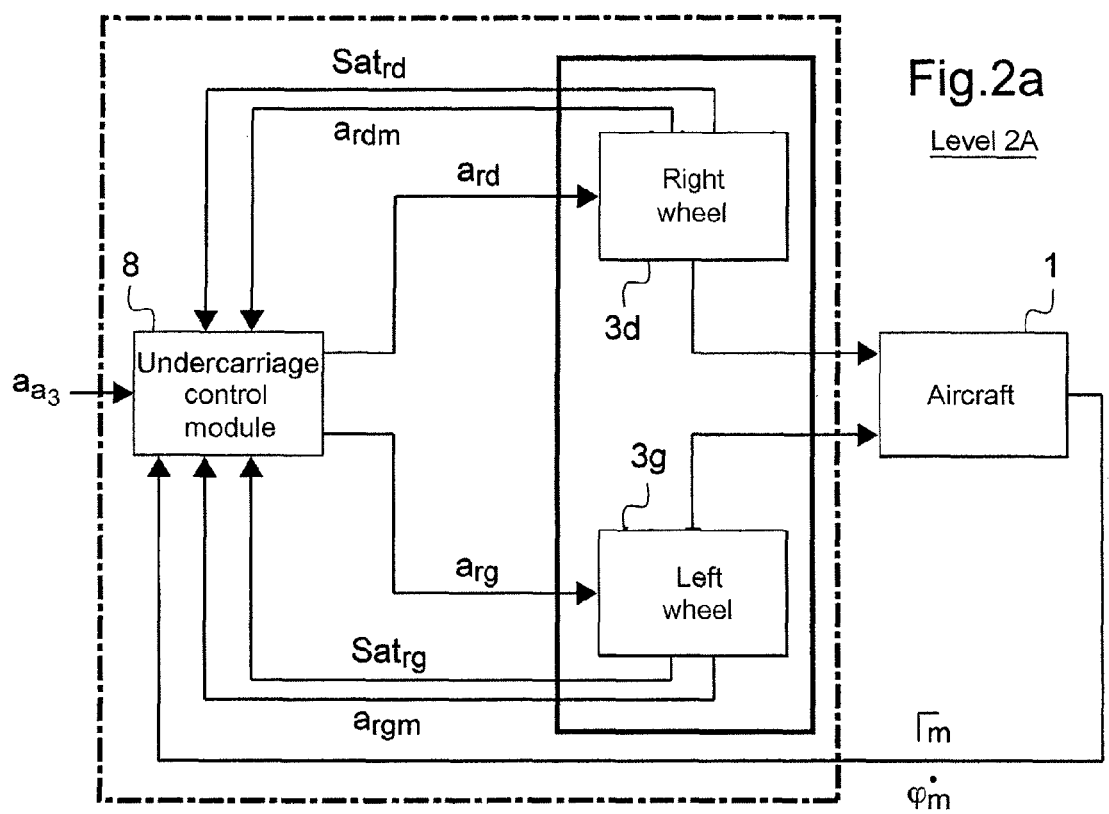
FIGS. 2a and 2b are diagrams of the method of the invention being implemented at a second hierarchical level lower than the level of FIG. 1.
Figure 2B:
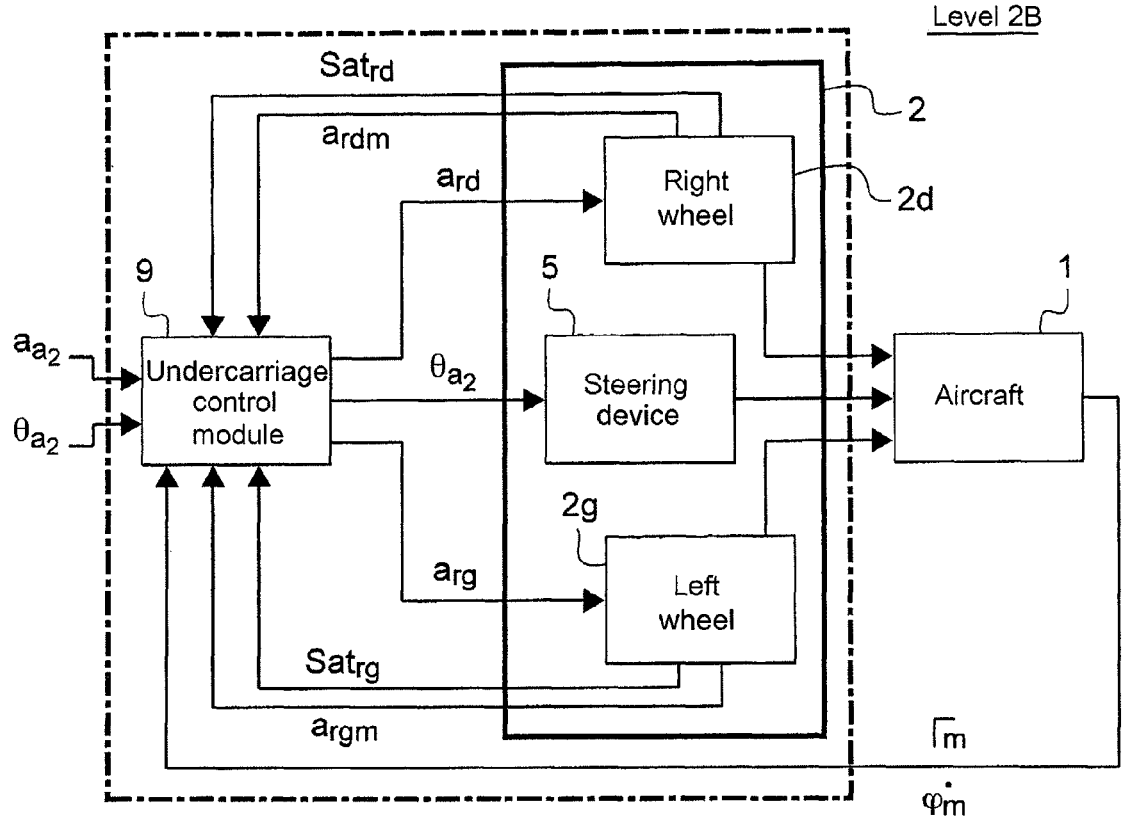
Figure 3:
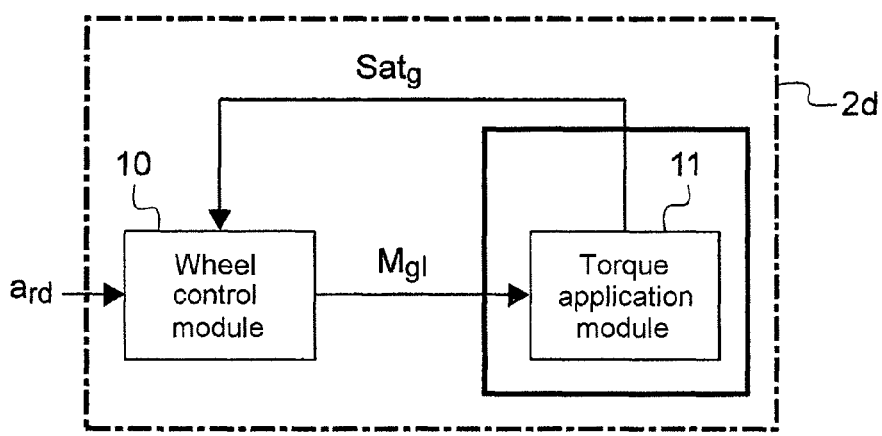
FIG. 3 is a diagram of a use of the method of the invention at a third hierarchical level lower than that of FIGS. 2a and 2b.

With reference to FIGS. 1 to 3, the method of the invention is described in detail herein in application to an aircraft 1 including landing gear having at least one auxiliary undercarriage 2 situated at the nose of the aircraft and at least one left main undercarriage 3 and at least one right main undercarriage 4.

A pilot seeking to cause the aircraft 1 to move on the ground acts on various controls (such as rudder pedals or a control wheel) in order to generate an overall setpoint that is made up of a longitudinal acceleration setpoint $\Gamma_c$ and an angular speed setpoint $\dot{\phi}_c$.

Each undercarriage 2, 3, 4 of the aircraft 1 in this example has a left wheel and a right wheel given respective references 2g and 2d, 3g and 3d (the wheels of the right main undercarriage not being shown in the figures), each associated with a torque application member for applying torque to the wheel in response to the longitudinal acceleration setpoint $\Gamma_c$ of the aircraft 1. In addition, the torque application members of the wheels of the left and right main undercarriages 3 and 4 can also apply torque to the wheels in such a manner as to create a difference in speed of rotation between the wheels of the left main undercarriage 3 and the wheels of the right main undercarriage 4 in response to the angular speed setpoint $\dot{\phi}_c$ of the aircraft 1. In accordance with the invention, in this example, the auxiliary undercarriage 2 includes a steering device 5 enabling the bottom portion of the auxiliary undercarriage 2 to be steered, likewise in response to the annular speed setpoint $\dot{\phi}_c$ of the aircraft 1.

With reference to FIG. 1, at the first hierarchical level for controlling the landing gear (level 1 or aircraft level) on the basis of the general setpoint ($\Gamma_c$, $\dot{\phi}_c$), a control module of the aircraft 6 determines simultaneously an undercarriage acceleration setpoint $a_{a2}$, $a_{a3}$, $a_{a4}$ for each of the undercarriages 2, 3, and 4, and also an undercarriage steering angle setpoint $\theta_{a2}$ for the auxiliary undercarriage 2 in such a manner that together the undercarriage acceleration setpoints $a_{a2}$, $a_{a3}$, $a_{a4}$ and the steering angle setpoint $\theta_{a2}$ provide a response to the general setpoint ($\Gamma_c$, $\dot{\phi}_c$).

In a manner that is itself known, under certain circumstances (wet runway, defective acceleration means, . . . ), it can happen that one or more of the undercarriages can generate only a limited amount of acceleration, thereby preventing the corresponding undercarriage acceleration setpoint from being achieved. Under such circumstances, a saturation signal $Sat_{a2}$, $Sat_{a3}$, $Sat_{a4}$ is sent by the auxiliary undercarriage 2 or by the left or right main undercarriage 3 or 4 in question to the aircraft control module 6, which then takes this saturation into account in order to determine the undercarriage acceleration setpoints $a_{a2}$, $a_{a3}$, $a_{a4}$ and a steering angle setpoint $\theta_{a2}$ suitable for responding as well as possible to the general setpoint ($\Gamma_c$, $\dot{\phi}_c$).

According to the invention, throughout the time aircraft 1 is moving on the ground, parameters representative of the movement of the aircraft 1 are measured, e.g. by measuring the real angular speed $\dot{\phi}_m$ and the real longitudinal acceleration $\Gamma_m$ of the aircraft 1. On the basis of the measured angular speed $\dot{\phi}_m$ and of the measured longitudinal acceleration $\Gamma_m$, the aircraft control module 6 determines undercarriage acceleration setpoints $a_{a2}$, $a_{a3}$, $a_{a4}$ and the undercarriage steering angle setpoint $\theta_{a2}$ while taking account of an error between the angular speed setpoint $\dot{\phi}_c$ and the measured angular speed $\dot{\phi}_m$, and also of an error between the longitudinal acceleration setpoint $\Gamma_c$, and the measured longitudinal acceleration $\Gamma_m$, the longitudinal acceleration setpoint $\Gamma_c$ and the angular acceleration setpoint $\dot{\phi}_c$ being processed simultaneously by the aircraft control module 6. By regulating (7) the undercarriage acceleration $a_{a2}$, $a_{a3}$, $a_{a4}$ and also the steering angle $\theta_{a2}$ of the auxiliary undercarriage 2, movement on the ground of the aircraft 1 is obtained that complies with the general setpoint ($\Gamma_c$, $\dot{\phi}_c$), at least under normal operating conditions for the undercarriages 2, 3, 4.

In a preferred implementation, throughout the time the aircraft 1 is moving on the ground, the undercarriage steering angle $\theta_{a2m}$ is measured. On the basis of the measured undercarriage steering angle $\theta_{a2m}$, the aircraft control module 6 determines the undercarriage steering angle setpoint $\theta_{a2}$ while taking account of an error between the undercarriage steering angle setpoint $\theta_{a2}$ and the measured steering angle $\theta_{a2m}$. By regulating the undercarriage steering angle $\theta_{a2}$, a steering angle is obtained that complies with the steering angle setpoint without it being necessary for the first regulation 7 to incorporate directly the error between the undercarriage steering angle setpoint $\theta_{a2}$ and the measured undercarriage steering angle $\theta_{a2m}$. In similar manner, throughout the time the aircraft 1 is moving on the ground, an estimate is made of the undercarriage accelerations $a_{a2m}$, $a_{a3m}$, $a_{a4m}$ of each of the undercarriages on the basis of various measurements of parameters representative of the movement of the aircraft 1: speed of rotation of the wheels of the undercarriages, angular speed of the aircraft, . . . . On the basis of the estimated undercarriage accelerations, the aircraft control module 6 determines the undercarriage acceleration setpoints $a_{a2}$, $a_{a3}$, $a_{a4}$, while taking account of an error between the undercarriage acceleration setpoints $a_{a2}$, $a_{a3}$, $a_{a4}$ and the estimated undercarriage accelerations $a_{a2m}$, $a_{a3m}$, $a_{a4m}$.

The method of the invention thus makes it possible to manage simultaneously the steering angle of the bottom portion of the auxiliary undercarriage 2, the difference in speeds of rotation between the main undercarriages 3 and 4, and also the longitudinal acceleration of each of the undercarriages 2, 3, 4. This reduces the workload on the pilot, who needs only to manage the controls without being concerned how the general setpoint ($\Gamma_c$, $\dot{\phi}_c$) is shared among the undercarriages 2, 3, 4 in order to ensure that the aircraft 1 performs the required movement on the ground.

According to the invention, the landing gear is also controlled at a second hierarchical level. With reference to FIG. 2a, the level 2A (or level of an undercarriage with a non-steerable bottom portion) is illustrated in application to the left main undercarriage 3. The right main undercarriage 4, also having a bottom portion that is likewise not steerable, is managed in a manner identical to the left main undercarriage 3.

An undercarriage control module 8 receives the undercarriage acceleration setpoint $a_{a3}$ from the level 1. On the basis of the undercarriage acceleration setpoint $a_{a3}$, the undercarriage control module 8 determines simultaneously a wheel acceleration setpoint $a_{rd}$, $a_{rg}$ for each of the wheels 3d, 3g of the left main undercarriage 3 in such a manner that the wheel acceleration setpoints $a_{rd}$, $a_{rg}$ together correspond to the undercarriage acceleration setpoint $a_{a3}$.

Identically with level 1, a saturation signal $Sat_{rd}$, $Sat_{rg}$ is sent by the right wheel 3d or by the left wheel 3g in question to the undercarriage control module 8 if one or more of the wheels can generate only limited acceleration preventing the corresponding wheel acceleration setpoint from being achieved, with the undercarriage control module 8 then taking this saturation into account in order to determine the wheel acceleration setpoints $a_{rd}$, $a_{rg}$ that serve to approach as closely as possible to the undercarriage acceleration setpoint $a_{a3}$.

Identically with level 1, throughout the time the aircraft 1 is moving on the ground, parameters representative of the movement of the wheels are measured, e.g. the speeds of rotation of the wheels are measured, from which the acceleration $a_{rdm}$, $a_{rgm}$ of each of the wheels is estimated. On the basis of these wheel acceleration estimates, the undercarriage control module 8 determines the wheel acceleration setpoints $a_{rd}$, $a_{rg}$, while taking account of any error between the wheel acceleration setpoints $a_{rd}$, $a_{rg}$ and the estimated wheel accelerations $a_{rdm}$, $a_{rgm}$.

In a preferred implementation, the undercarriage control module 8 also acquires the measured angular speed $\dot{\phi}_m$ and the measured longitudinal acceleration $\Gamma_m$ in order to determine the wheel acceleration setpoints $a_{rd}$, $a_{rg}$, while taking account of the behavior of the aircraft compared with the required movement on the ground.

With reference to FIG. 2b, level 2B (or the level of the undercarriage having a steerable bottom portion) is illustrated in application to the auxiliary undercarriage 2.

In level 2B, identically with the undercarriage control module 8 of level 2A, an undercarriage control module 9 determines from the undercarriage acceleration setpoint $a_{a2}$, a wheel acceleration setpoint $a_{rd}$, $a_{rg}$ for each of the wheels 2d, 2g of the auxiliary undercarriage 2 in such a manner that the wheel acceleration setpoints $a_{rd}$, $a_{rg}$ together correspond to the undercarriage acceleration setpoint $a_{a2}$.

A saturation signal $Sat_{rd}$, $Sat_{rg}$ is sent by the right wheel 2d or by the left wheel 2g in question to the undercarriage control module 9 if one or more of the wheels can generate only limited acceleration preventing the corresponding wheel acceleration setpoint from being achieved, the undercarriage control module 9 then taking this saturation into account in order to determine the wheel acceleration setpoints $a_{rd}$, $a_{rg}$ that enable the undercarriage acceleration setpoint $a_{a2}$ to be approached as closely as possible.

Throughout the time the aircraft 1 is moving on the ground, parameters representative of the movements of the wheels are measured, e.g. the speeds of rotation of the wheels are measured, from which estimates are made of the accelerations $a_{rdm}$, $a_{rgm}$ of each of the wheels. On the basis of these wheel acceleration estimates, the undercarriage control module 9 determines the wheel acceleration setpoints $a_{rd}$, $a_{rg}$, while taking account of any error between the wheel acceleration setpoints $a_{rd}$, $a_{rg}$ and the estimated wheel accelerations $a_{rdm}$, $a_{rgm}$.

In a preferred implementation, the undercarriage control module 9 also acquires the measured angular speed $\dot{\phi}_m$ and the measured longitudinal acceleration $\Gamma_m$ in order to determine the wheel acceleration setpoints $a_{rd}$, $a_{rg}$, while taking account of the behavior of the aircraft relative to the required movement on the ground.

Furthermore, the undercarriage control module 9 acts simultaneously with managing the wheel accelerations $a_{rd}$, $a_{rg}$ to manage a steering angle for the bottom portion of the auxiliary undercarriage 2. For this purpose, the undercarriage control module 9 transmits the undercarriage steering angle setpoint $\theta_{a2}$ to the steering device 5.

In accordance with the invention, the landing gear is also controlled at a third hierarchical level. With reference to FIG. 3, level 3 (or wheel level) is illustrated in application to the right wheel 2d of the auxiliary undercarriage 2. Each of the wheels of the undercarriage is controlled in a manner identical to the right wheel 2d of the auxiliary undercarriage 2.

A wheel control module 10 receives the undercarriage acceleration setpoint $a_{rd}$ from level 2B and it determines a general torque setpoint $M_{gl}$ to be generated by the torque application member 11 associated with the wheel 2d so that the general torque setpoint $M_{gl}$ serves to satisfy the wheel acceleration setpoint $a_{rd}$.

The various levels described above are organized in a hierarchy in such a manner that the torques applied to the wheels by all of the torque application members in response to the general torque setpoints $M_{gl}$ and the steering setpoint for the bottom portion of the auxiliary undercarriage in response to the steering angle setpoint $\theta_{a2}$ act together to enable the aircraft to respond to the general setpoint ($\Gamma_c$, $\dot{\phi}_c$).

Identically with level 1, a saturation signal $Sat_g$ is sent by the torque application member 11 to the wheel control module 10 if the torque application member 11 can generate only a limited torque preventing the general torque setpoint $M_{gl}$ from being achieved. The wheel control module 10 then takes this saturation into account in order to determine the general torque setpoint $M_{gl}$ enabling the wheel acceleration setpoint $a_{rd}$ to be approached as closely as possible.

Control level 3 is thus independent of the type of torque application member 11 that is associated with the wheels 2d, thus making it possible to use the method for any type of application member technology.

Figure 4:
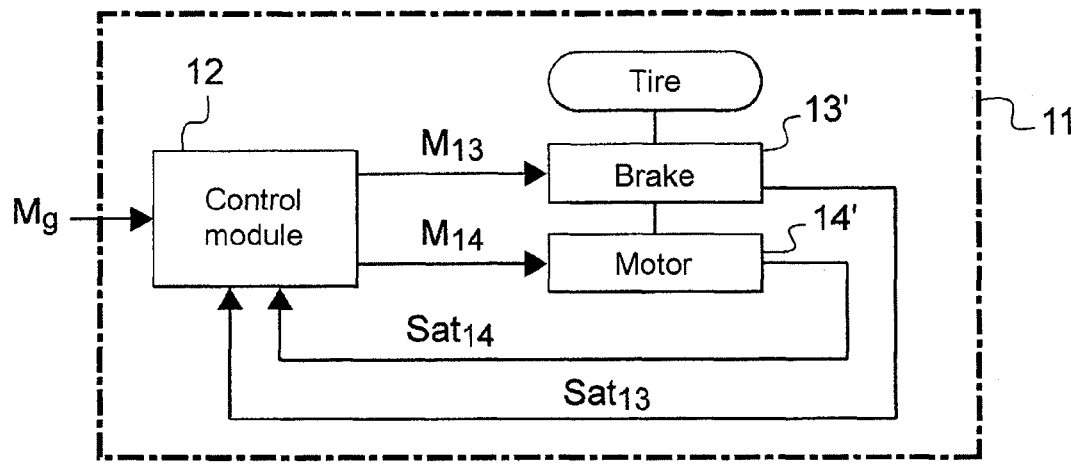
FIG. 4 is a diagram of a use of the method of the invention at a fourth hierarchical level lower than that of FIG. 3.

According to the invention, the undercarriage is also controlled at a fourth hierarchical level. With reference to FIG. 4, level 4 (or torque application member level) is illustrated in application to the torque application member 11 of the wheel 2d, with the torque application member 11 in this example comprising two components: a friction brake 13 and a motor 14. In this example, each of the torque application members of the landing gear is controlled in a manner identical to the torque application member 11 of the wheel 2d.

In known manner, the friction brake 13 and the motor 14 of the torque application member 11 are controlled by a control module 12. On the basis of the general torque setpoint $M_{gl}$, the control module 12 determines for each of the components 13, 14 of the torque application member 11 an individual torque setpoint $M_{13}$, $M_{14}$, such that the individual torque setpoints $M_{13}$, $M_{14}$ when taken together correspond to the general torque setpoint $M_{gl}$.

Identically with the above-described levels, a saturation signal $Sat_{13}$, $Sat_{14}$ is sent by a component of the torque application member 11 to the control module 12 if said component can generate only a limited torque preventing the general torque setpoint $M_{gl}$ being achieved. The control module 12 then takes this saturation into account in order to determine the individual torque setpoints $M_{13}$, $M_{14}$ that serve to come as close as possible to the required general torque setpoint $M_{gl}$.

Figure 5:
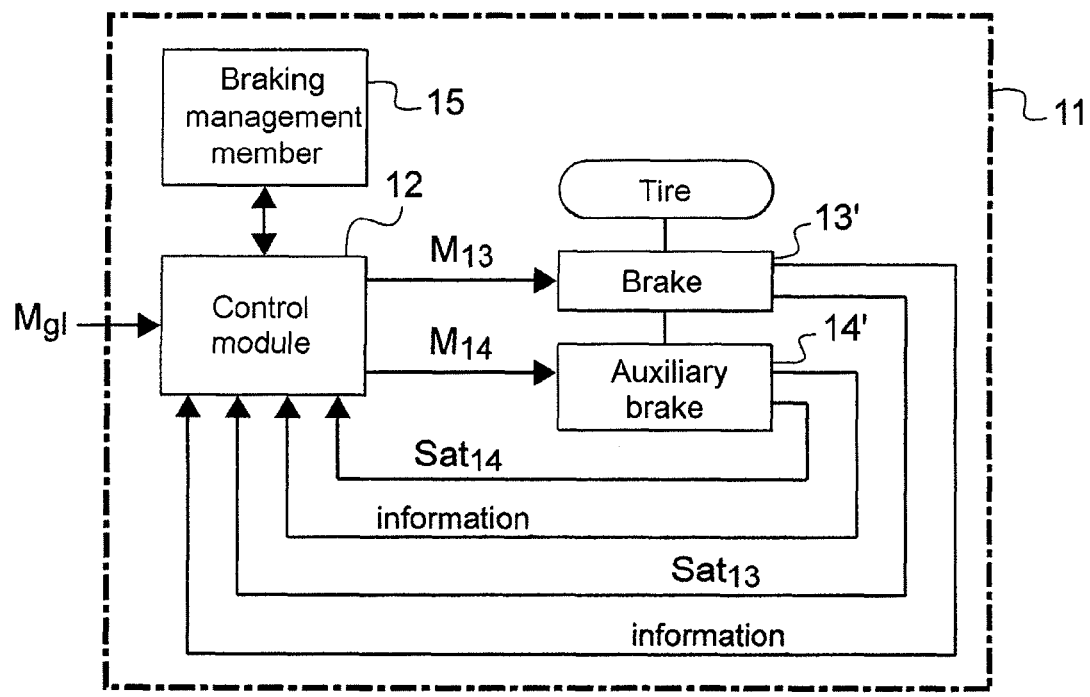
FIG. 5 is a diagram of a use of the method of the invention in another implementation in a fourth hierarchical level lower than that of FIG. 3.

In a preferred implementation, with reference to FIG. 5, level 4 (or torque application member level) is illustrated in application to the torque application member 11 comprising two components: a friction brake 13' and an auxiliary brake 14' that provides auxiliary braking by dissipating energy other than by friction. The torque application member 11 then comprises a braking management member 15 acting, while braking the wheel 2d, to share braking between the friction brake 13' and the auxiliary brake 14'. To this end, when the wheel acceleration setpoint $a_{rd}$ is negative, i.e. when there is a braking setpoint for the wheel 2d, the braking management unit 15 acts via the control module 12 to acquire information representative of the braking parameters of the friction brake 13' and of the auxiliary brake 14', such as for example the temperature of the friction brake 13' or of the auxiliary brake 14'. On the basis of this information, the braking management unit 15 determines whether the wheel 2d is in a braking situation for which the friction brake 13' is not essential for performing the required braking. The braking management unit 15 then communicates with the control module 12 in order to determine the individual torque setpoints $M_{13}$, $M_{14}$ in such a manner as to privilege actuating the auxiliary brake 14' so long as the wheel 2d remains within said braking situation, with the friction brake 13' being actuated only in the event of the wheel 2d departing from said braking situation. Thus, the braking management member 15 serves in particular to minimize wear of the friction elements.

Naturally, the invention is not limited to the implementation described and implementation variants may be applied thereto without going beyond the ambit of the invention as defined by the claims.

Although it is stated that the aircraft 1 has one auxiliary undercarriage 2 at the front and two main undercarriages 3, 4 at the rear, the undercarriages could naturally have any other configuration. In addition, the aircraft 1 may include any other number of undercarriages and each undercarriage may have any other number of wheels. Furthermore, the aircraft 1 may have any other number of undercarriages with a steerable bottom portion and any other number of wheels associated with a torque application member. In addition, each torque application member may comprise elements that differ in number and type from those shown. For example, the torque application member may comprise only a friction brake. It is also possible to replace a friction brake with a hydraulic brake. It should be recalled that one of the advantages of the invention is that it is very adaptable to the configuration of the aircraft.

In particular, although the method described herein serves to manage simultaneously the steering of the bottom portion of the auxiliary undercarriage 2, the difference in speeds of rotation between the main undercarriages 3, 4, and also the longitudinal acceleration of each of the undercarriages 2, 3, 4, the method of the invention could be used solely for managing the difference between the speeds of rotation of the main undercarriages 3, 4 and their longitudinal acceleration.

In particular, although the pilot is described above as acting on various controls to generate the general setpoint ($\Gamma_c$, $\dot{\phi}_c$), one or the other of the two components of the general setpoint could naturally be zero, depending on the movement on the ground that the pilot seeks to cause the aircraft 1 to perform. In addition, the terms "acceleration" and "speed" are used herein not only to mean acceleration and speed that are positive, but also acceleration and speed that are negative, even though negative acceleration is also known as deceleration.

What is claimed is:

1. A method of managing movement of an aircraft on the ground, the aircraft having at least one left main undercarriage and at least one right main undercarriage, each having wheels associated with torque application members for applying torque to the wheels in response to a general setpoint, the general setpoint comprising a longitudinal acceleration setpoint and an angular speed setpoint, wherein the method comprises the successive steps of:

from the general setpoint, determining for each of the undercarriages an undercarriage acceleration setpoint in such a manner that the undercarriage acceleration setpoints together enable the general setpoint to be satisfied;

for each of the undercarriages, determining from the undercarriage acceleration setpoint and for each of the wheels of said undercarriage, a wheel acceleration setpoint in such a manner that the wheel acceleration setpoints together correspond to the undercarriage acceleration setpoint; and for each of the wheels, determining from the wheel acceleration setpoint a general torque setpoint for the torque to be generated by the torque application member associated with said wheel in such a manner that the general torque setpoint enables the wheel acceleration setpoint to be satisfied, and in such a manner that the torques applied to the wheels by the torque application members in response to the general torque setpoints together enable the aircraft to satisfy the general setpoint.

2. The method according to claim 1, applied to an aircraft in which at least one of the torque application members includes at least two components, the method including the step of determining from the general torque setpoint and for each of the components of said torque application member, an individual torque setpoint in such a manner that the individual torque setpoints together correspond to the general torque setpoint.

3. The method according to claim 1, applied to an aircraft further including one or more undercarriages, each of which includes a steering device for steering the bottom portion of the undercarriage in response to the angular speed setpoint, the method including the step of responding to the angular speed setpoint to determine for each of the undercarriages having a steerable bottom portion an undercarriage steering angle setpoint in such a manner that the undercarriage steering angle setpoint and the undercarriage acceleration setpoints together enable the general setpoint to be satisfied.

4. The method according to claim 1, applied to an aircraft in which at least one torque application member includes at least a friction brake and at least an auxiliary brake that dissipates energy by means other than friction, the method including the steps of:

when a wheel acceleration setpoint is negative, acting as a function of braking parameters of the friction brake and of the auxiliary brake to determine whether the wheel is in a braking situation in which the friction brake is not essential for generating the braking setpoint;

while giving priority to actuating the auxiliary brake so long as the wheel remains within said braking situation, and actuating the friction brake only if the wheel departs from said braking situation.

* * * * *